No. 659,616. Patented Oct. 9, 1900.
W. H. & E. H. BRISTOL.
RECORDING AIR PYROMETER.
(Application filed May 24, 1900.)
(No Model.)
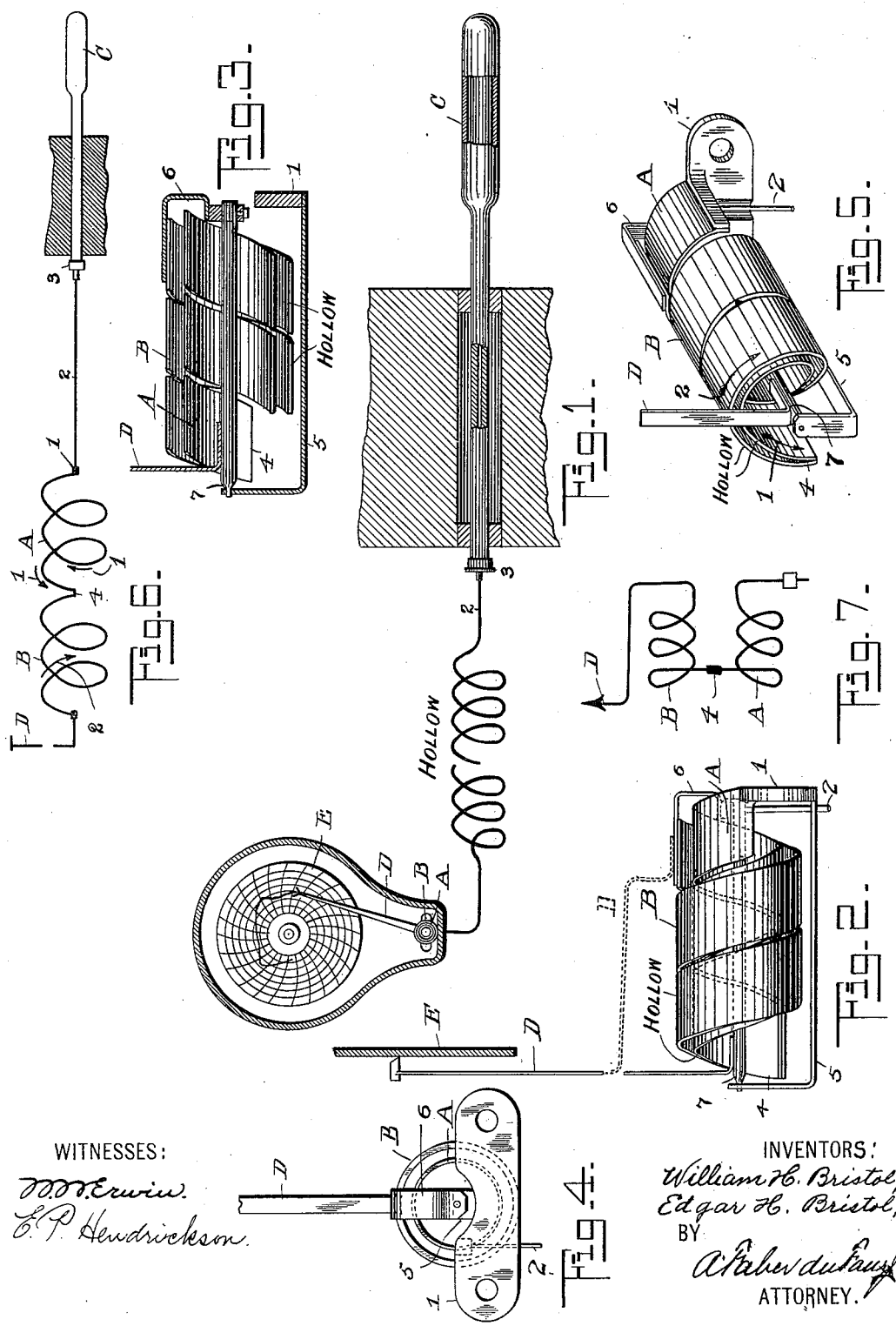
WITNESSES:
D. W. Erwin.
E. P. Hendrickson.
INVENTORS:
William H. Bristol,
Edgar H. Bristol,
BY
A. Faber du Faur
ATTORNEY.
THE NORRIS PETERS CO., PHOTO-LITHO., WASHINGTON, D. C.

UNITED STATES PATENT OFFICE.

WILLIAM H. BRISTOL, OF HOBOKEN, NEW JERSEY, AND EDGAR H. BRISTOL, OF NAUGATUCK, CONNECTICUT, ASSIGNORS TO THE BRISTOL COMPANY, OF WATERBURY, CONNECTICUT, AND NEW YORK, N. Y.

RECORDING AIR-PYROMETER.

SPECIFICATION forming part of Letters Patent No. 659,616, dated October 9, 1900.

Application filed May 24, 1900. Serial No. 17,846. (No model.)

*To all whom it may concern:*

Be it known that we, WILLIAM H. BRISTOL, residing at Hoboken, in the county of Hudson and State of New Jersey, and EDGAR H. BRISTOL, residing at Naugatuck, in the county of New Haven and State of Connecticut, citizens of the United States, have invented certain new and useful Improvements in Recording Air-Pyrometers, of which the following is a specification.

Our invention has reference to improvements in air-pyrometers, and has for its object to provide an instrument of this character which will make a continuous record upon a dial or chart and which will render unnecessary the corrections for barometer and thermometer heretofore required to be made in the reading of the instrument when air-pyrometers of the usual known constructions were employed, thus effecting saving of time and labor, as the readings can be taken directly from the instrument.

To this end our invention consists, essentially, in the combination of an indicating tube or spring adapted to be turned axially by variations of pressure in the air-bulb due to changes in the temperature being measured and having one end attached to a base and a compensating tube or spring having one end placed in mechanical connection with the free end of the indicating tube or spring and its other end in connection with the indicating or recording arm, said compensating tube or spring being turned axially by variations in atmospheric pressure and temperatures in a direction opposite to the movements of the indicating tube or spring under the same influences and so influencing the position of the indicating or recording arm as to compensate for errors which would be due to barometric and thermometric changes.

The nature of our invention will best be understood when described in connection with the accompanying drawings, in which—

Figure 1 represents a sectional elevation of an air-pyrometer embodying our invention. Fig. 2 is a side elevation, on an enlarged scale, of the indicating and compensating tubes or springs and parts appertaining thereto. Fig. 3 is a longitudinal section thereof. Fig. 4 is an end view of the same. Fig. 5 is a perspective view. Fig. 6 is a diagram illustrating the principle involved. Fig. 7 is a diagram illustrating a modified form.

Similar letters and numerals of reference designate corresponding parts throughout the several views of the drawings.

Referring to the drawings, the letter A designates the indicating tube or spring; B, the compensating tube or spring; C, the bulb, made of a suitable refractory material, such as porcelain, and D the indicating or recording arm arranged opposite to a suitable chart or scale E. The tubes or springs A and B are substantially of the same construction as the tube or spring shown in our prior patent, No. 514,256, dated February 6, 1894, each of the same consisting of a metallic tube of flattened cross-section formed into a helix of, in this instance, three convolutions. By having a tube or spring of two or more complete convolutions we are enabled to obtain sufficient movement at the free end of the tube or spring to dispense with multiplying devices intermediate of the tube or spring and the indicating or recording arm, as either one of the tubes or springs may be considered a series of Bourdon tubes connected end to end to concur in action, and consequently the combined movement of the component tubes or springs under pressure will be communicated to the free end of the terminal or structure and impart to the same an axial rotation through an angle corresponding substantially to the movement of the several convolutions taken collectively. This construction being described and claimed in our prior patent referred to, we make no claim to it in the present application, our invention relating, essentially, to the manner of arranging and connecting the two tubes or springs so that the tube or spring B will compensate for barometric and thermometric changes where the indicating or recording part of the instrument is located. The indicating tube or spring A has its inner end attached to a bracket 1, by means of hard solder or otherwise, so as to form a perfectly air-tight joint, and to said end is conducted a tube 2, having a very fine bore. The other end of said tube is attached by means of a suitable air-tight joint 3, Fig. 1, to the bulb C. The free or front end of the tube or spring A is connected to the adjacent end of the compensating tube or spring B, as at 4; but there is absolutely no connection between the interior of the two tubes or springs. In a forwardly-extending arm 5 of the bracket 1 is formed a bearing for one end of a shaft 7, extending longitudinally and centrally through the tubes or springs and having its opposite end rigidly secured in a hanger 6, attached to the rear end of the compensating tube or spring B. To the front end of this shaft is attached the indicating or recording arm D, and consequently the latter participates in the movements of said shaft. It will now be seen that if the indicating tube or spring A is turned in either direction the compensating tube or spring B participates in such movements without exerting any retarding action on the indicating tube or spring, in view of the connection 4 between the two tubes or springs and the connection of the outer tube or spring with the shaft 7, which causes said shaft to turn in its bearing in the arm 5. The two tubes or springs are made of equal strength, and therefore the same internal or external pressure will produce the same angular movement in each. In practice the air in the bulb C, the indicating tube or spring A, and the connecting-tube 2 is exhausted to a large degree and the air in the compensating tube or spring is almost exhausted for a purpose to be hereinafter described. The air being almost exhausted from the bulb, the latter when cold is subjected exteriorly to nearly atmospheric pressure, which, however, has no tendency to crack a bulb of refractory material, such as porcelain. When the bulb is subjected to furnace temperatures, the small amount of air in the bulb expands and produces a pressure practically balancing the external pressure, and consequently relieves the bulb of strains when in its weakest condition.

To illustrate the operation of the instrument, let it be assumed that the air has been almost exhausted from the compensating tube or spring and that the barometer rises. Under such circumstances the indicating tube or spring A would turn toward the left of Fig. 5 if the compensating tube or spring were not present—that is, in the direction indicated by arrow 1 in said figure and in diagram, Fig. 6; but the compensating tube or spring B being present and tending to turn to the right of Fig. 5—that is, in the direction of arrow 2, Figs. 5 and 6—through the same angle the effect of changes in atmospheric pressure is neutralized, and the position and indication of the indicating or recording arm is unaffected by the rise of atmospheric pressure. For like reasons there would be no movement of the indicating or recording arm when there is a fall in atmospheric pressure. By not entirely exhausting the compensating tube or spring B the same will compensate also for thermometric changes in the same manner, the indicating tube or spring tending to turn in the direction of arrow 1 when the thermometer falls and in the direction of arrow 2 when it rises, while the compensating tube or spring tends to turn in the opposite direction. By leaving a calculated amount of air in the compensating tube or spring B compensation can be made perfect for any change in atmospheric temperature when the bulb C is at a given average temperature. To explain this more fully, let it be assumed that the instrument is adjusted for a working temperature of 2,000° Fahrenheit. Then in that case we exhaust the air in the compensating tube or spring to such an extent that the internal pressure in said tube or spring will be slightly less than the pressure in the indicating tube or spring, caused by the given temperature. Consequently, as the tubes or springs have equal angular motion for equal changes of pressure, a change of temperature at the recording part will have no appreciable effect, and consequently the instrument will accurately record changes of temperature at the bulb.

It is evident that instead of placing the tubes or springs A and B one within the other they may be arranged as shown in Fig. 6, where they are in line and connected mechanically end to end at 4, the end of the indicating tube or spring A being rigidly held in the bracket 1 and the free end of the compensating tube or spring B carrying the indicating or recording arm D. The tubes or springs A and B may also be arranged one above the other or side by side, as indicated diagrammatically in Fig. 7.

We do not wish to restrict ourselves to the specific construction for the hollow movable parts herein described, as it is evident that other constructions possessing the same features and producing the same result could be substituted therefor, the essential feature of our invention being the compensation for changes in barometer and thermometer by influencing the position of the indicating or recording arm or other device for effecting an indication or record.

If desired, the shaft 7 and its bearing may be omitted, as they are used merely for the purpose of steadying the tubes or springs, the indicating or recording arm in this case being attached directly to the free end of the compensating tube or spring, as indicated in dotted lines in Fig. 2

What we claim as new is—

1. An indicating or recording device for air-pyrometers comprising two tubes coiled in the same direction, of which the first tube is rigidly held at one end and has its other end attached to the adjacent end of the second tube; said tubes being thereby caused to turn axially in opposite directions by barometric or thermometric changes, an indicating or recording arm, and an operative connection between the free end of the second tube and said indicating or recording arm, substantially as described.

2. An indicating or recording device for air-pyrometers comprising a coiled indicating-tube, a compensating tube coiled in the same direction as the indicating-tube and placed in mechanical connection with the free end of the same; said tubes being thereby caused to turn axially in opposite directions by barometric or thermometric changes, a connection between the bulb and the indicating-tube, and an indicating or recording arm placed in connection with the free end of the compensating tube, substantially as described.

3. In an air-pyrometer, the combination with a coiled indicating-tube having one end rigidly secured, a compensating tube coiled in the same direction as the indicating-tube and having one end attached to the adjacent end of the latter and its other end attached to and holding one end of a shaft, a support for the opposite end of the shaft, an indicating or recording arm attached to the shaft, a bulb, and a tube placing said bulb in communication with the indicating-tube at its fast end, substantially as described.

4. In an air-pyrometer, the combination with a coiled indicating-tube having one end rigidly secured to a bracket, a compensating tube coiled in the same direction as the indicating-tube and having its adjacent end mechanically attached to the free end of the indicating-tube and its other end attached to and holding one end of a shaft extending through the tubes, an arm extending from the bracket and forming a bearing for the opposite end of the shaft, an indicating or recording arm attached to said shaft, a bulb, and a tube connecting the bulb with the fast end of the indicating-tube, substantially as described.

5. An indicating or recording device for air-pyrometers comprising two tubes coiled in the same direction and one coil placed within the other, the first of said tubes being rigidly held at one end and having its other end in mechanical connection with the adjacent end of the second tube; whereby the tubes are adapted to turn axially in opposite directions under barometric or thermometric changes, an indicating or recording arm, and an operative connection between the latter and the free end of the second tube, substantially as described.

6. An air-pyrometer comprising two connected hollow parts coiled in the same direction and adapted to be affected by barometric or thermometric changes to move in opposite directions for compensating for influence of such changes, a bulb placed in communication with one of the hollow parts, and an indicating or recording device influenced and operated by the movements of said parts, substantially as described.

7. An air-pyrometer comprising two connected hollow parts coiled in the same direction and adapted to be affected by barometric or thermometric changes to move in opposite directions for the purpose of compensation, a bulb placed in communication with one of the hollow parts; said bulb and hollow parts being exhausted below atmospheric pressure, and an indicating or recording device influenced and operated by the movements of said parts, substantially as described.

8. An air-pyrometer or the like having a bulb, an indicator, and a compensator formed by two connected hollow parts adapted to be affected by barometric or thermometric changes to move in opposite directions for the purpose of compensation, one of said hollow parts being placed in communication with the bulb, and the other hollow part being mechanically connected with the free end of the first hollow part and carried by the same, substantially as described.

9. An air-pyrometer or the like having a bulb, an indicator, and a compensator formed by two tubes coiled in the same direction; one of said tubes being in communication with the bulb and mechanically connected with and carrying the other tube, substantially as described.

10. An air-pyrometer or the like having a bulb, an indicator, and a compensator formed by two tubes helically coiled in the same direction; one of said tubes being in communication with the bulb and mechanically connected with and carrying the other tube, substantially as described.

11. An air-pyrometer or the like having a bulb, an indicator, and a compensator formed by two coiled tubes, of which the first tube is in communication with the bulb and the second tube is mechanically connected with the free end of the first tube and carried by said first tube, substantially as described.

In testimony whereof we have hereunto set our hands in the presence of two subscribing witnesses.

WILLIAM H. BRISTOL.
    EDGAR H. BRISTOL.

Witnesses:
    CHAS. W. BANBY,
    FRANKLIN B. BRISTOL.